United States Patent
Kim et al.

(10) Patent No.: US 11,757,104 B2
(45) Date of Patent: Sep. 12, 2023

(54) CATALYST SUPPORT MATERIALS FOR FUEL CELLS

(71) Applicant: Robert Bosch GmbH, Stuttgart (DE)

(72) Inventors: Soo Kim, Cambridge, MA (US); Jonathan Mailoa, Cambridge, MA (US); Mordechai Kornbluth, Brighton, MA (US); Lei Cheng, Sunnyvale, CA (US); Georgy Samsonidze, San Francisco, CA (US); Boris Kozinsky, Waban, MA (US); Nathan Craig, Santa Clara, CA (US)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 17/734,558

(22) Filed: May 2, 2022

(65) Prior Publication Data

US 2022/0263098 A1   Aug. 18, 2022

Related U.S. Application Data

(62) Division of application No. 16/591,032, filed on Oct. 2, 2019, now abandoned.

(51) Int. Cl.
*H01M 4/90* (2006.01)
*H01M 4/88* (2006.01)
*H01M 4/92* (2006.01)

(52) U.S. Cl.
CPC ....... *H01M 4/9033* (2013.01); *H01M 4/8825* (2013.01); *H01M 4/9075* (2013.01); *H01M 4/921* (2013.01); *H01M 4/925* (2013.01)

(58) Field of Classification Search
CPC .. H01M 4/9075; H01M 4/925; H01M 4/9033; H01M 4/8825; H01M 4/921
See application file for complete search history.

(56) References Cited

U.S. PATENT DOCUMENTS

| | | |
|---|---|---|
| 7,811,959 B2 | 10/2010 | Lee et al. |
| 9,608,278 B2 | 3/2017 | Hayden et al. |
| 9,837,668 B2 | 12/2017 | Cerri et al. |

(Continued)

FOREIGN PATENT DOCUMENTS

| | | | |
|---|---|---|---|
| WO | 2006124959 A2 | 11/2006 | |
| WO | WO-2009152003 A2 * | 12/2009 | ............ B01J 21/063 |
| WO | 2018231998 A1 | 12/2018 | |

OTHER PUBLICATIONS

Bandura et al., "Comparisons of Multilayer H2O Adsorption onto the (110) Surfaces of r-TiO2 and SnO2 as Calculated with Density Functional Theory", American Chemical Society, Aug. 20, 2008, 9 pages.

(Continued)

*Primary Examiner* — Jeremiah R Smith
(74) *Attorney, Agent, or Firm* — Brooks Kushman P.C.

(57) ABSTRACT

A catalyst support material for a proton exchange membrane fuel cell (PEMFC). The catalyst support material includes a metal material of an at least partially oxidized form of $TiNb_3O_6$ reactive with $H_3O^+$, HF and/or $SO_3^-$ to form reaction products in which the metal material of the at least partially oxidized form of $TiNb_3O_6$ accounts for a stable molar percentage of the reaction products.

20 Claims, 7 Drawing Sheets

(56) References Cited

U.S. PATENT DOCUMENTS

| | | | |
|---|---|---|---|
| 2004/0072061 A1 | 4/2004 | Nakano et al. | |
| 2006/0263675 A1 | 11/2006 | Adzic et al. | |
| 2007/0003823 A1 | 1/2007 | Mei et al. | |
| 2007/0248862 A1 | 10/2007 | Park et al. | |
| 2009/0312181 A1 | 12/2009 | Do et al. | |
| 2010/0233574 A1 | 9/2010 | Masao et al. | |
| 2012/0021337 A1 | 1/2012 | Merzougui et al. | |
| 2012/0122019 A1 | 5/2012 | Disalvo, Jr. et al. | |
| 2012/0295184 A1 | 11/2012 | Watanabe et al. | |
| 2014/0004444 A1* | 1/2014 | Cerri | H01M 4/92 429/489 |
| 2014/0193746 A1* | 7/2014 | Cerri | H01M 4/921 502/339 |
| 2015/0141240 A1 | 5/2015 | Roller et al. | |
| 2015/0243999 A1 | 8/2015 | Takahashi et al. | |
| 2015/0368817 A1 | 12/2015 | Xu et al. | |
| 2017/0263943 A1 | 9/2017 | Li et al. | |
| 2018/0006313 A1* | 1/2018 | Haas | H01M 4/921 |
| 2019/0109330 A1 | 4/2019 | Shirvanian et al. | |
| 2019/0109344 A1 | 4/2019 | Wang et al. | |

OTHER PUBLICATIONS

Davies et al., "Stabilising Oxide Core-Platinum Shell Catalysts for the Oxygen Reduction Reaction", Electrochimica Acta, Jul. 28, 2017, United Kingdom, 8 pages.

Jovic et al., "Corrosion behavior of select MAX phases in NaOH, HCl and H2SO4", Corrosion Science 48 (2006), XP028025825, 9 pages.

Dongwoon Jung et al.; "Factors Affecting the Magnitude of the Metal-Insulator Transition Temperature in AMo4O6 (A=K, Sn)"; Bull. Korean Chem Soc. 2004, vol. 25, No. 7, p. 959.

Dongwoon Jung et al.; "Synthesis, Characterization, and Electronic Structure of a New Molybdenum Bronze SnMo4O6"; Chem. Mater. 2001, 13, 5, 1625-1629.

Pourbaix, "Atlas of Electrochemical Equilibria in Aqueous Solutions", NACE International Cebelcor, Texas, 1974, 648 pages.

Sharma et al., "Support Materials for PEMFC and DMFC electrocatalysts—A Review", Journal of Power Sources 208 (2012), XP055027731, 24 pages.

* cited by examiner

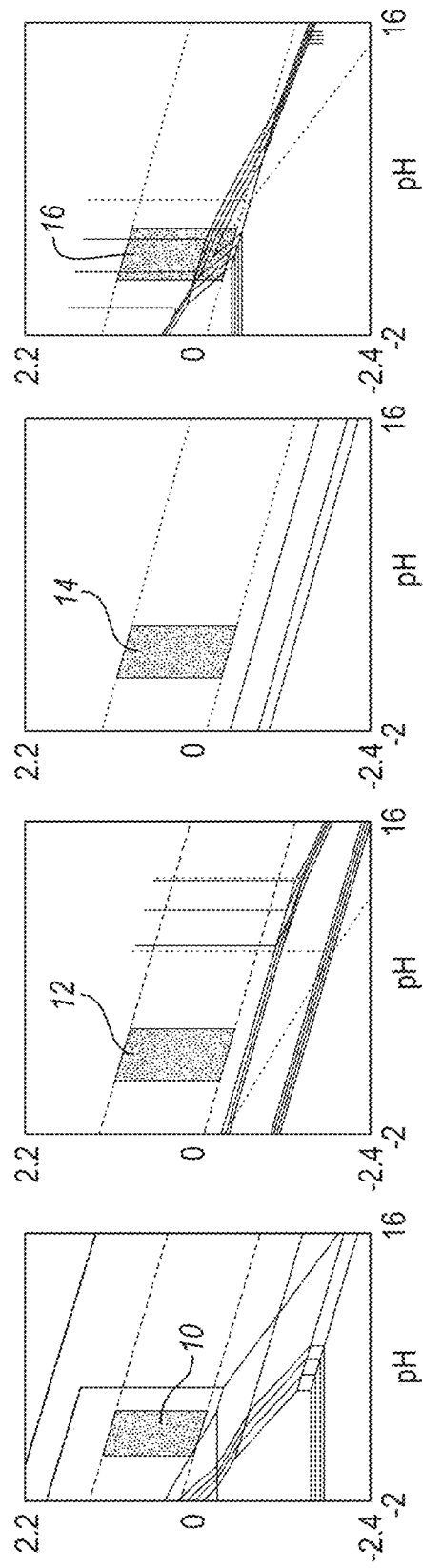
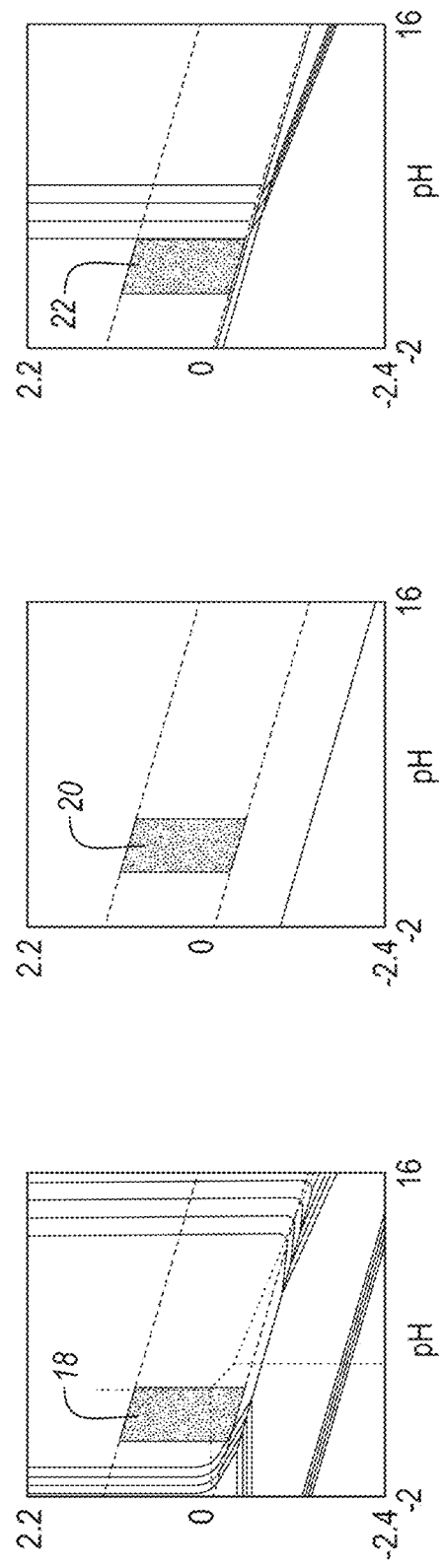
FIG. 1A  FIG. 1B  FIG. 1C  FIG. 1D
FIG. 1E  FIG. 1F  FIG. 1G

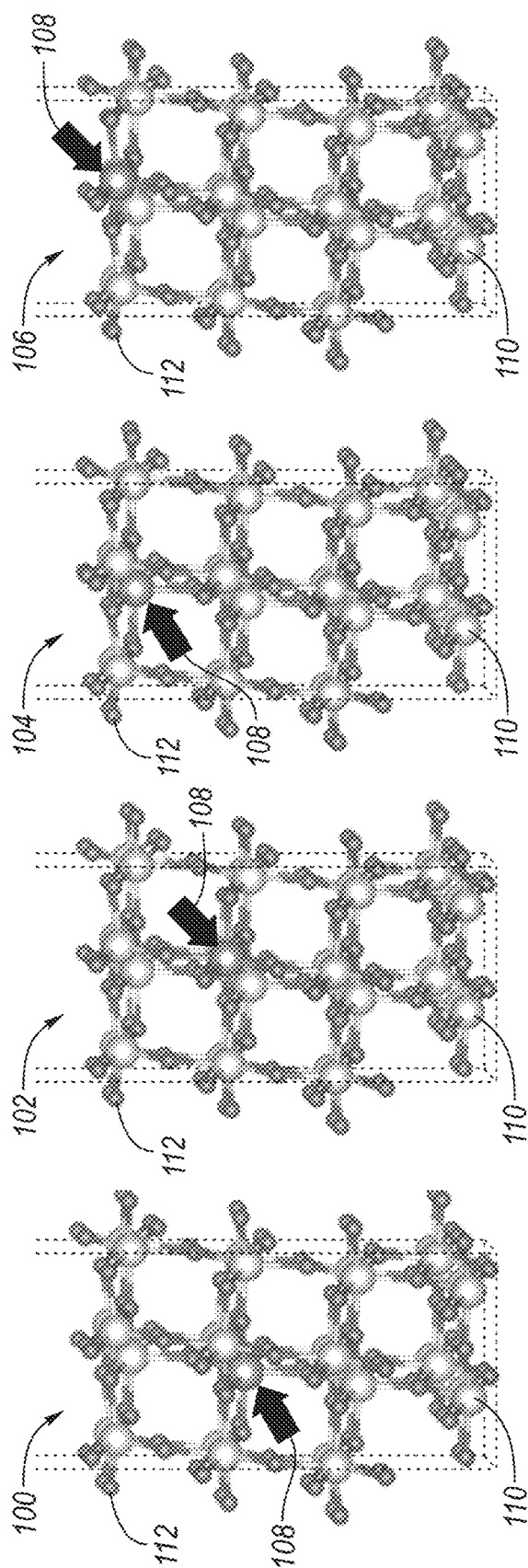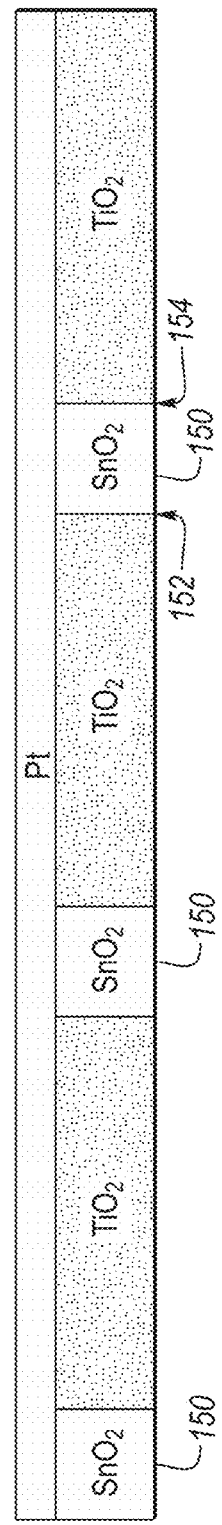
FIG. 3A  FIG. 3B  FIG. 3C  FIG. 3D
FIG. 4

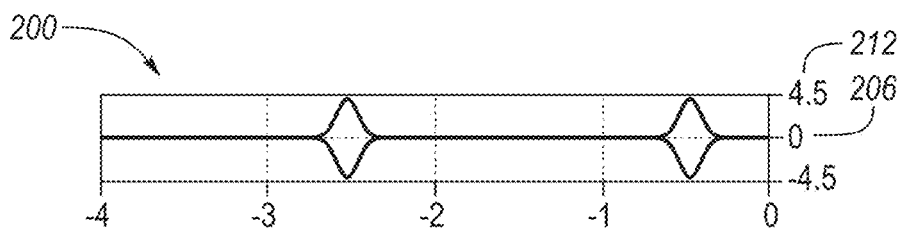
FIG. 5A
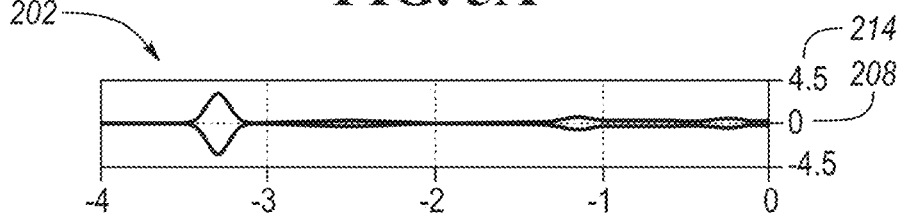
FIG. 5B
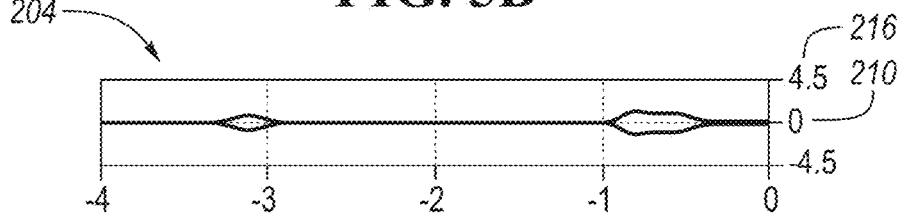
FIG. 5C
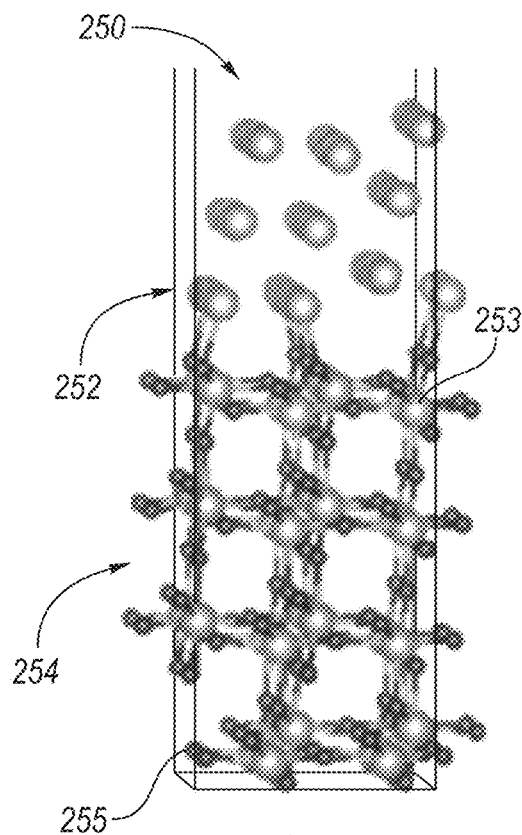 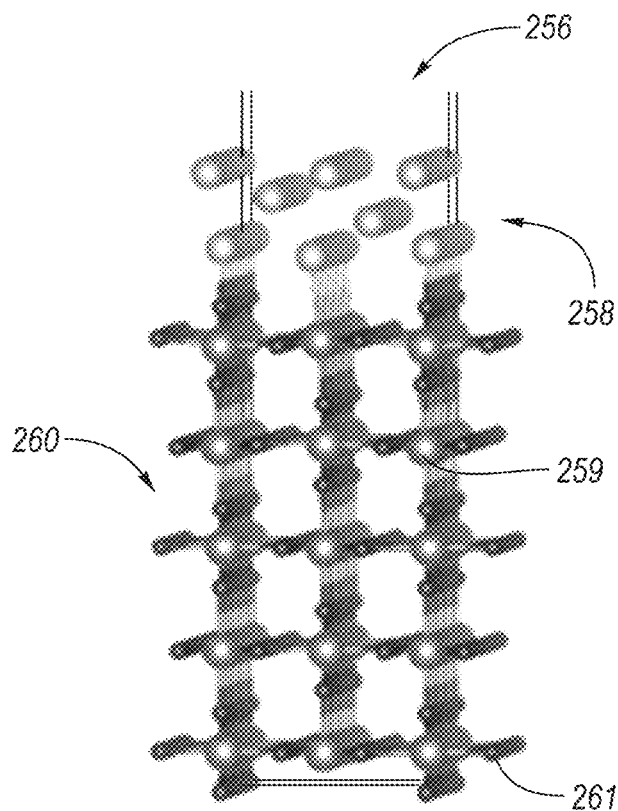
FIG. 6A          FIG. 6B

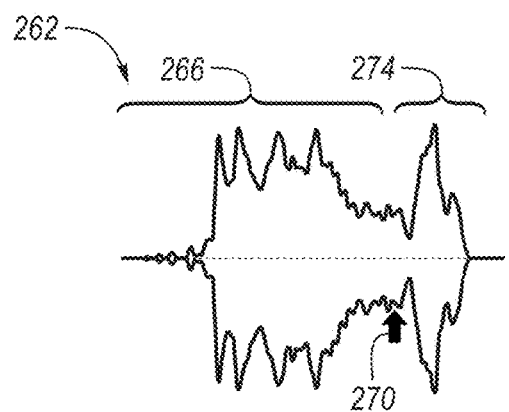
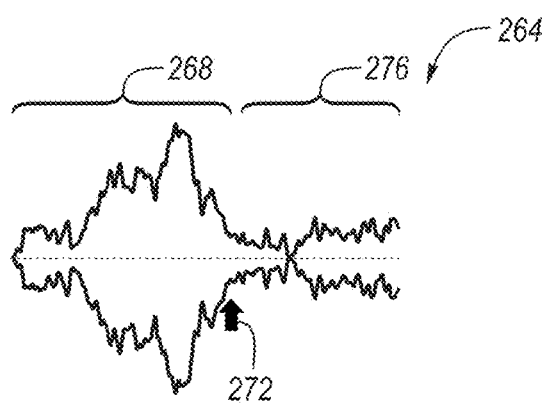
FIG. 6C          FIG. 6D
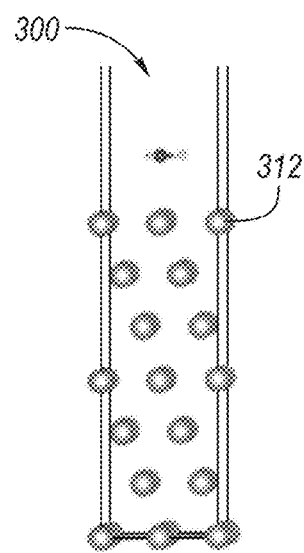
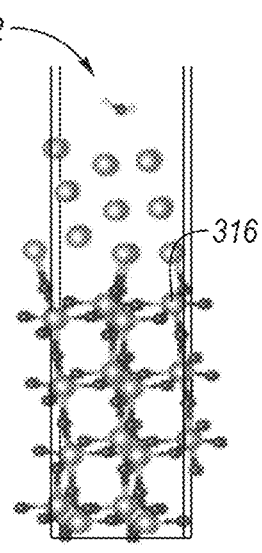
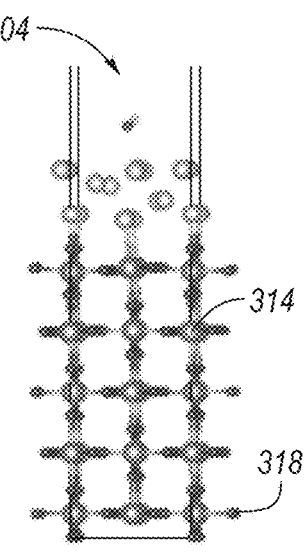
FIG. 7A          FIG. 7B          FIG. 7C
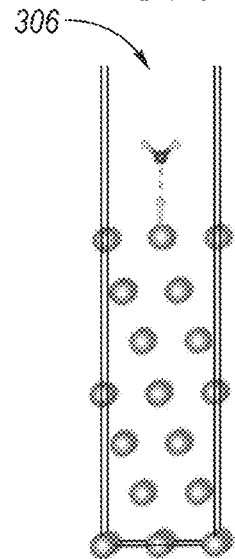
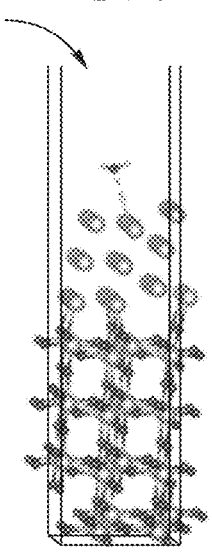
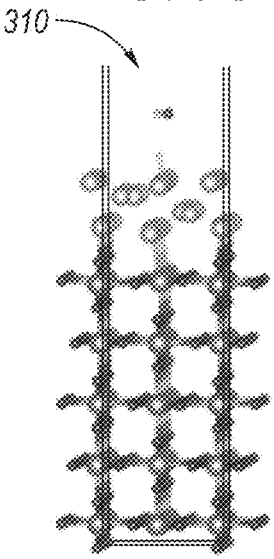
FIG. 7D          FIG. 7E          FIG. 7F

CATALYST SUPPORT MATERIALS FOR FUEL CELLS

CROSS-REFERENCE TO RELATED APPLICATION

This application is a divisional of U.S. application Ser. No. 16/591,032 filed Oct. 2, 2019, the disclosure of which is incorporated herein by reference in its entirety.

TECHNICAL FIELD

The present disclosure relates to catalyst support materials, such as metal oxides, metal carbides and/or intermetallic compounds, for fuel cells.

BACKGROUND

One of the most common catalysts used within proton exchange membrane fuel cells (PEMFCs) is platinum due to its excellent catalytic activity and its stability to withstand the operating conditions of the PEMFC. Typically, catalyst materials are supported on catalyst support materials, such as a solid material with a high surface area. The catalyst support material may be inert so that it does not contribute to any catalytic reaction within the PEMFC. One of the most common catalyst support materials for PEMFCs is carbon. Under certain operating conditions, carbon catalyst support materials may oxidize, thereby detrimentally affecting the catalytic activity of the catalyst material.

SUMMARY

According to one embodiment, a catalyst support material for a proton exchange membrane fuel cell (PEMFC) is disclosed. The catalyst support material includes a metal material of an at least partially oxidized form of $TiNb_3O_6$ reactive with $H_3O^+$, HF and/or $SO_3^-$ to form reaction products in which the metal material of the at least partially oxidized form of $TiNb_3O_6$ accounts for a stable molar percentage of the reaction products.

According to another embodiment, a proton exchange membrane fuel cell (PEMFC) is disclosed. The PEMFC includes a catalyst support material formed of a metal material of an at least partially oxidized form of $TiNb_3O_6$ reactive with $H_3O^+$, HF and/or $SO_3^-$ to form reaction products in which the metal material of an at least partially oxidized form of $TiNb_3O_6$ accounts for a stable molar percentage of the reaction products. The PEMFC further includes a catalyst supported on the catalyst support material.

In yet another embodiment, a proton exchange membrane fuel cell (PEMFC) is disclosed. The PEMFC includes a catalyst support material formed of a metal material of an at least partially oxidized form of $TiNb_3O_6$ reactive with $H_3O^+$, HF and/or $SO_3^-$ to form reaction products in which the metal material of an at least partially oxidized form of $TiNb_3O_6$ accounts for a stable molar percentage of the reaction products. The PEMFC further includes a catalyst film supported on the catalyst support material.

BRIEF DESCRIPTION OF THE DRAWINGS

FIG. 1A through 1G depict Pourbaix diagrams for seven (7) different metals, i.e., titanium, germanium, niobium, molybdenum, tin, tantalum, and tungsten.

FIGS. 3A through 3D depict schematic views of models of chemical structures of various Sn-doped (101) $TiO_2$ surface slab models.

FIG. 4 depicts a schematic view of nano-domains of $SnO_2$ within a bulk material of $TiO_2$.

FIGS. 5A through 5C depict graphs of density of state (DOS) for pure $H_2O$, (b) $H_2O$ on anatase (101) $TiO_2$, and (c) $H_2O$ on rutile (110) $SnO_2$, respectively, according to one or more embodiments.

FIG. 6A is a schematic view of an interface model between a platinum catalyst and a $TiO_2$ surface according to one or more embodiments.

FIG. 6B is a schematic view of an interface model between a platinum catalyst and an $SnO_2$ surface according to one or more embodiments.

FIG. 6C depicts a DOS graph for the interface model shown in FIG. 6a.

FIG. 6D depicts a DOS graph for the interface model shown in FIG. 6b.

FIGS. 7A through 7C depict schematic views of $H_2O$ bindings on pure Pt (111), Pt on anatase (101) $TiO_2$, and (c) Pt on rutile (110) $SnO_2$, respectively, according to one or more embodiments.

FIGS. 7D through 7F depict schematic views of $H_3O^+$ bindings on pure Pt (111), Pt on anatase (101) $TiO_2$, and Pt on rutile (110) $SnO_2$, respectively, according to one or more embodiments.

DETAILED DESCRIPTION

Figure 2:
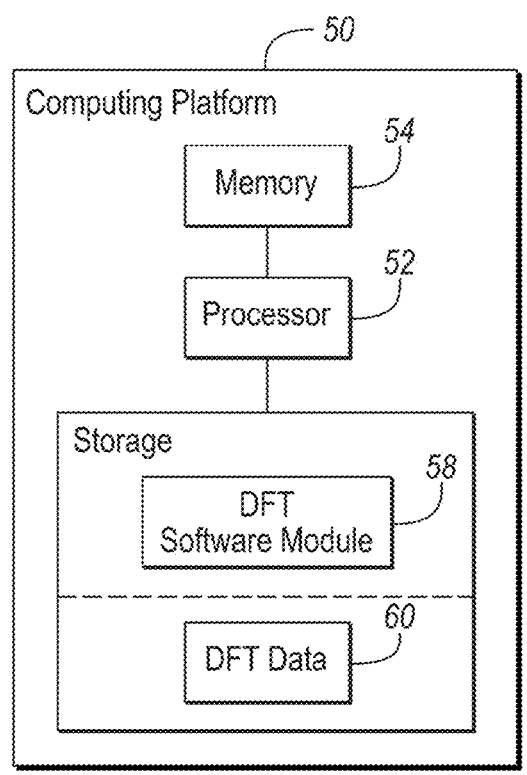
FIG. 2 is a schematic diagram of a computing platform that may be utilized to implement DFT algorithms and/or methodologies of one or more embodiments.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; the description of a group or class of materials as suitable or preferred for a given purpose in connection with the invention implies that mixtures of any two or more of the members of the group or class are equally suitable or preferred; molecular weights provided for any polymers refers to number average molecular weight; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

This invention is not limited to the specific embodiments and methods described below, as specific components and/or conditions may, of course, vary. Furthermore, the terminology used herein is used only for the purpose of describing particular embodiments of the present invention and is not intended to be limiting in any way.

As used in the specification and the appended claims, the singular form "a," "an," and "the" comprise plural referents unless the context clearly indicates otherwise. For example, reference to a component in the singular is intended to comprise a plurality of components.

The term "substantially" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic. Any value or relative characteristic disclosed herein may be modified by "substantially" whether or not the word "substantially" is used.

One of the most common catalysts used within proton exchange membrane fuel cells (PEMFCs) is platinum due to its excellent catalytic activity and its stability to withstand the operating conditions of the PEMFC. Typically, catalyst materials are supported on catalyst support materials, such as a solid material with a high surface area. The catalyst support material may be inert so that it does not contribute to any catalytic reaction within the PEMFC. One of the most common catalyst support materials for PEMFCs is carbon. Under certain operating conditions (e.g., during the start-up and shutdown processes), carbon catalyst support materials may oxidize, thereby potentially leading to degradation of the catalyst material and reducing the lifetime of the PEMFC.

Accordingly, metal oxides have been studied as an alternative catalyst support material. Metal oxides, as opposed to carbon, may have a tendency for improved stability and/or resistance against further oxidation. While metal oxides show promise because of improved stability and/or oxidative resistance, the metal oxide material should also be stable in the PEMFC operating environment, which is usually acidic (i.e., low pH) and is subject to different voltages applied to the fuel cell (e.g., 0 volts to 1.23 volts).

In one embodiment, Pourbaix diagrams may be utilized to investigate the stable phases in an aqueous electrochemical system, where boundaries between phases are divided by lines. Pourbaix diagrams may be drawn for any chemical system and can indicate regions of immunity, corrosion and passivity. Immunity typically occurs for noble metals, such as, but not limited to gold, iridium, platinum, rhodium, ruthenium, and palladium. The noble metals are typically very expensive and rare. Corrosion may happen in the form of dissolution and gasification. Corrosion may happen to transition metals, such as, but not limited to iron and nickel in acidic conditions (i.e., low pH). Some metals may be coated with a passivating film, typically in the form of metal oxides.

FIGS. 1A through 1G depict Pourbaix diagrams for seven (7) different metals, i.e., titanium (Ti), germanium (Ge), niobium (Nb), molybdenum (Mo), tin (Sn), tantalum (Ta), and tungsten (W). According to these Pourbaix diagrams, titanium, germanium, niobium, molybdenum, tin, tantalum, and tungsten form stable metal oxides, $TiO_2$, $GeO_2$, $Nb_2O_5$, $MoO_3$, $SnO_2$, $Ta_2O_5$, and $WO_3$, respectively, in shaded regions, 10, 12, 14, 16, 18, 20 and 22, respectively, where pH varies from 1 to 4 and voltage is applied between 0 to 1.23 V (in this example, voltage decreases as pH increases), which are conditions relevant to PEMFC operation. Metals systems made of titanium, germanium, niobium, molybdenum, tin, tantalum, and tungsten are typically more abundant and less expensive than noble metal systems.

Doping tin (Sn) with titania ($TiO_2$) may be used as a catalyst support material for platinum. When doping up to 10% Sn in $TiO_2$, increased mass activity may be demonstrated. When a catalyst support material has 23 to 40% Sn doping in $TiO_2$, less platinum is required. A catalyst support material at less than 28% doping of Sn in $TiO_2$ is stable in an acidic condition at 80° C.

In one embodiment, first-principles density functional theory (DFT) algorithms, calculations and/or methodologies are used to model the solubility of Sn in bulk anatase $TiO_2$. The DFT algorithms, calculations and/or methodologies of one or more embodiments are implemented using a computer platform, such as the computing platform 50 illustrated in FIG. 2. The computing platform 50 may include a processor 52, memory 54, and non-volatile storage 56. The processor 52 may include one or more devices selected from high-performance computing (HPC) systems including high-performance cores, microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 54. The memory 54 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information. The non-volatile storage 56 may include one or more persistent data storage devices such as a hard drive, optical drive, tape drive, non-volatile solid state device, cloud storage or any other device capable of persistently storing information.

Processor 52 may be configured to read into memory 54 and execute computer-executable instructions residing in DFT software module 58 of the non-volatile storage 56 and embodying DFT slab model algorithms, calculations and/or methodologies of one or more embodiments. DFT software module 58 may include operating systems and applications. DFT software module 58 may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Upon execution by the processor 52, the computer-executable instructions of the DFT software module 58 may cause the computing platform 50 to implement one or more of the DFT algorithms and/or methodologies disclosed herein. Non-volatile storage 56 may also include DFT data 60 supporting the functions, features, calculations, and processes of the one or more embodiments described herein.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

In one embodiment, the $TiO_2$ modelled using DFT software module 58 is bulk anatase $TiO_2$ of spacegroup I41/amd (tetragonal) and lattice parameters: a=b=3.803; c=9.748 Å; α=β=γ=90°. The DFT calculations were performed using the Vienna ab-initio software package (VASP) within a generalized gradient approximation (GGA) scheme. In one embodiment, the cut off energy was set to 520 eV. A k-point per reciprocal atoms (KPPRA) value can be any of the following values or in a range of any two of the following values: 1,000, 1,500, 2,000, 2,500, 3,000, 3,500, 4,000, 4,500, 5,000, 5,500, 6,000, 6,500, 7,000, 7,500 and 8,000. The KPPRA value can vary depending on supercell size.

Sn doping energies in $TiO_2$ and $SnO_2$—$TiO_2$ mixing energies may be calculated using DFT software module 58. The doping energy in $TiO_2$ ($\Delta E_{doping}$) may be determined using the following equation (1):

$$\Delta E_{doping} = E_0(Sn_xTi_{1-x}O_2) - E_0(TiO_2) + x\mu(Ti) - x\mu(Sn) \quad (1)$$

where $E_0$ is the DFT internal energy of species i, x is fractional composition, and μ is chemical potential of species i.

The $SnO_2$—$TiO_2$ mixing energies ($\Delta E_{mixing}$) may be determined using the following equation (2):

$$\Delta E_{mixing} = E_0(Sn_xTi_{1-x}O_2) - [xE_0(SnO_2) + (1-x)E_0(TiO_2)] \quad (2)$$

Table 1 below shows the Sn doping energy in $TiO_2$ and $SnO_2$—$TiO_2$ mixing energies for different values of x in $Sn_xTi_{1-x}O_2$.

TABLE 1

| $Sn_xTi_{1-x}O_2$ | $\Delta E_{doping}$ [eV/site] | $\Delta E_{mixing}$ [eV/site] |
|---|---|---|
| x = 0.25 | 4.895 | 0.229 |
| x = 0.5 | 4.814 | 0.297 |

FIGS. 3A through 3D depict schematic views of models 100, 102, 104 and 106 of chemical structures of various Sn-doped (101) $TiO_2$ surface slab models. Each model 100, 102, 104 and 106 depict Sn 108, Ti 10 and O 112. Each model depicts a Sn 108 is located at various atomic coordinates within the (101) $TiO_2$ slab model (from the bulk-region toward surface). The segregation energies relative to $E_{doping,\ bulk}$ of the Sn 108 in each model 100, 102, 104 and 106 is +0.03 eV, +0.14 eV, +0.17 eV, and +0.25 eV, respectively. Based on these values, it is observed that the Sn atom prefers to stay in the bulk region, rather than separating out toward the surface of (101) $TiO_2$. From Table 1, it is observed that it takes a significant amount of energy to dope Sn into a $TiO_2$ bulk system, regardless of the composition (i.e., close to 5 eV/Sn). The DFT mixing energy of $SnO_2$ and $TiO_2$ is relatively high, meaning that these two compositions do not mix significantly at room temperature. Based on these values and observations, the Sn could have limited solubility in $TiO_2$, thereby forming nano-domains 150 of $SnO_2$, as shown in FIG. 4. At the edges 152 and 154 of $SnO_2$, there may be a relatively small amount of solubility. In certain embodiments, pure Sn and Ti metals may mix, thereby forming various intermetallic compounds, such as $Ti_3Sn$, $Ti_2Sn$, $Ti_6Sn_5$, and $Ti_2Sn_3$. DFT calculations indicate that these intermetallic compounds prefer phase-separation upon heat treatment to form an oxide.

DFT calculations support that an $H_2O$ molecule tends to dissociate on rutile (110) $SnO_2$ surface, while $H_2O$ stays to be in molecular form on rutile (110) $TiO_2$. In one or more embodiments, DFT calculations have been performed on ½$H_2$, ½$O_2$, and $H_2O$ bindings on anatase (101) $TiO_2$ and rutile (110) SnO$_2$ surfaces. $\Delta E_{binding}$ is determined by the following equation (3):

$$\Delta E_{binding,i} = E_0(\text{final}) - [E_0(\text{slab}) + \mu(\text{adsorbate})] \qquad (3)$$

where $E_0$ is the DFT internal energy and θ is chemical potential of species i.

Table 2 below shows the ½H$_2$, ½O$_2$, and H$_2$O binding energies on anatase (101) TiO$_2$ and rutile (110) SnO$_2$ surfaces.

TABLE 2

| System | $\Delta E_{binding, H}$ [eV/site] | $\Delta E_{binding, O}$ [eV/site] | $\Delta E_{binding, H2O}$ [eV/site] |
|---|---|---|---|
| Anatase (101) TiO$_2$ | 0.039 | 1.758 | −0.630 |
| Rutile (110) SnO$_2$ | −1.364 | 2.174 | −0.877 |

FIGS. 5A through 5C depict graphs of density of state (DOS) 200, 202 and 204 for pure H$_2$O, (b) H$_2$O on anatase (101) TiO$_2$, and (c) H$_2$O on rutile (110) SnO$_2$, respectively. The x-axis 206, 208 and 210 of graphs 200, 202 and 204, respectively, show the energy level (i.e., occupancy above/below the fermi level, $E_F$, x=0). The y-axis 212, 214 and 216 of graph 200, 202 and 204, respectively, show the DOS (states/eV). From FIGS. 5A through 5C, it is observed that H$_2$O on (110) SnO$_2$ tends to dissociate because of the weaker intensity shown in graph 204.

FIGS. 6A is a schematic view of an interface model 250 between platinum catalyst 252 and TiO$_2$ surface 254. The TiO$_2$ surface 254 includes Ti atoms 253 and O atoms 255. As shown in FIG. 6A, platinum catalyst 252 is 36 atoms of (111) Pt and TiO$_2$ surface 254 is 32 formula units of (101) TiO$_2$ surface. FIG. 6B is a schematic view of an interface model 256 between platinum catalyst 258 and SnO$_2$ surface 260. The SnO$_2$ surface 260 includes Sn atoms 259 and O atoms 261. As shown in FIG. 6B, platinum catalyst 258 is 12 atoms of (111) Pt surface and SnO$_2$ surface 260 is 20 formula units of (110) SnO$_2$ surface. FIG. 6C depicts a DOS graph 262 for interface model 250. FIG. 6D depicts a DOS graph 264 for interface model 256. Energy levels 266 and 268 below (i.e., x<0) the fermi level ($E_F$, x=0) 270 and 272, respectively, are the valence bands. Energy levels 274 and 276 above (x>0) the fermi level ($E_F$) 270 and 272 are conduction bands. When y>0 on DOS graphs 262 and 264, the electrons spin up. When y<0 on DOS graphs 262 and 264, the electrons spin down. The valence band is mostly occupied by d electrons in Pt. Typically, the conduction band of a pure metal is unoccupied. However, based on the DFT calculations, it is observed that the TiO$_2$ and SnO$_2$ are in the conduction band (i.e., above $E_F$), which is typical for transition metal oxides.

Table 3 below shows DFT interfacial energy of (111) Pt and catalyst support materials anatase (101) TiO$_2$ and rutile (110) SnO$_2$.

TABLE 3

| System | $\Delta E_{interfacial}$ [MeV/Å$^2$] | $\Delta E_{interfacial}$ [J/m$^2$] |
|---|---|---|
| (111) Pt ∥ Anatase (101) TiO$_2$ | −92.2 | −1.48 |
| (111) Pt ∥ Rutile (110) SnO$_2$ | −120.3 | −1.93 |

FIGS. 7A through 7C depict schematic views of H$_2$O bindings 300, 302 and 304 on pure Pt (111), Pt on anatase (101) TiO$_2$, and (c) Pt on rutile (110) SnO$_2$, respectively. FIGS. 7D through 7F depict schematic views of H$_3$O$^+$ bindings 306, 308 and 310 on pure Pt (111), Pt on anatase (101) TiO$_2$, and Pt on rutile (110) SnO$_2$, respectively. Circles 312 signify Pt atoms. Circles 314 signify Sn atoms. Circles 316 signify Ti atoms. Circles 318 signify O atoms.

Table 4 below shows DFT binding energies ($\Delta E_{binding}$) of H$_2$O and H$_3$O$^+$ on pure Pt (111), Pt on anatase (101) TiO$_2$, and Pt on rutile (110) SnO$_2$. Binding energies on pure Pt (111) are used as a reference (i.e., zero energy). It is observed while Pt on TiO$_2$ binds H$_2$O and H$_3$O$^+$ less strongly, Pt on SnO$_2$ binds H$_2$O and H$_3$O$^+$ more strongly, compared to pure Pt case. The unit for each binding energy calculation is eV.

TABLE 4

| System | $\Delta E_{binding, H2O}$ | $\Delta E_{rel, b, H2O}$ | $\Delta E_{binding, H3O}$ | $\Delta E_{rel, b, H3O}$ |
|---|---|---|---|---|
| (111) Pt ∥ (101) TiO$_2$ | −0.080 | +0.074 | −0.349 | +0.058 |
| (111) Pt ∥ (110) SnO$_2$ | −0.492 | −0.338 | −0.837 | −0.430 |
| Pure (111) Pt | −0.154 | Reference | −0.407 | Reference |

Figure 8:
FIG. 8 depicts a Ti—Nb—Ta—Mo—W—Ge—Sn—O—C convex hull chemical space.

In one or more embodiments, thermodynamically-stable materials forming binary or ternary oxides, carbides, and intermetallic compounds are used as catalyst support materials in PEMFCs. In one embodiment, the thermodynamically-stable materials include Ti, Nb, Ta, Mo, W, Ge, Sn, O and C. These materials may have a 'zero' convex hull distance. FIG. 8 depicts a Ti—Nb—Ta—Mo—W—Ge—Sn—O—C convex hull chemical space 350. Circles 352 represent a stable compound. Each line 354 represents a two-phase equilibrium. In one embodiment, this 9D (T=0K) phase diagram may be constructed using a high-throughput computational materials data, such as open quantum materials data, available from oqmd.org.

Table 5 shows a list of stable binary and ternary oxides for use as a catalyst support material in PEMFCs. The computed bandgaps ($E_g$) reported in Table 5 may be reported from materialsproject.org. Based on a typical support material of carbon being conducting, the stable binary and ternary oxide support materials of one or more embodiments have a zero or small bandgap. The electronic conductivity of these catalyst support materials may be further tuned by partially doping with doping materials such as nitrogen, carbon, fluorine or other elements, or by mixing with other conducting materials, such as carbon. The atomic percent (%) of partial doping may be any of the following values or in a range of any two of the following values: 1, 2, 3, 4, 5, 10, 15, 20 and 25 atomic %. The mol percent (%) of other conducting materials mixed with the catalyst support material may be 5, 10, 15, 20, 25, 30, 35, 40, 45 and 50 mol %.

Table 5 also reports the reactivity of each binary and ternary oxide with H$_3$O$^+$, HF and/or SO$_3^-$. For example, when SnO$_2$ reacts with HF, it may further decompose to more stable phase mixtures within the corresponding chemical space. In one or more embodiments, the specific reaction pathway may be determined using the lowest energy path within a thermodynamic database, such as oqmd.org. For instance, the specific reaction pathway for the SnO$_2$—HF reaction may be represented as follows in equation (4):

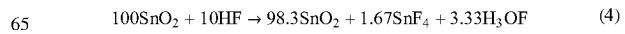

$$100\text{SnO}_2 + 10\text{HF} \rightarrow 98.3\text{SnO}_2 + 1.67\text{SnF}_4 + 3.33\text{H}_3\text{OF} \qquad (4)$$

In this example, 10 mol % of $H_3O^+$, HF and/or $SO_3^-$ are selected to react with the catalyst support compounds. In one or more embodiments, the catalyst support material is stable and protective in a PEMFC environment against $H_3O^+$, HF and/or $SO_3^-$ when the decomposition species on the reaction product side contains more than a certain percentage of oxide materials among the stable phase materials or reaction products. The oxide material percentage may be any of the following values or in a range of any two of the following values: 80, 82, 84, 86, 88, 90, 92, 94 and 96 percent. Based on reactivity and bandgap, the catalyst support materials of Table 5 are ranked as first-tier, second-tier, third-tier, or to be excluded. The first-tier materials may be used as catalyst supports. The first-tier candidate materials include: $SnO_2$, $MoO_3$, $Nb_2O_5$, $Ta_2O_5$, $TiO_2$, $WO_3$, $SnMo_4O_6$, and $TiNb_3O_6$. The second-tier and third-tier materials in Table 5 may be less protective in the PEMFC environment, compared to the first-tier materials. Some materials in Table 5 may be more insulating than the others. These insulating materials may be further optimized by mixing with more conducting materials such as carbon in the percentages identified above. Table 5 is shown below.

TABLE 5

| Compound | Oxide Class | Eg [eV] | Reactivities | | | Tier |
| | | | $H_3O^+$ | HF | $SO_3^-$ | |
|---|---|---|---|---|---|---|
| $SnO_2$ | Binary | 0.652 | 95 | 98.3 | 100 | First |
| $MoO_3$ | Binary | 1.372 | 95 | 98.9 | 100 | First |
| $Nb_2O_5$ | Binary | 1.614 | 95 | 99.3 | 100 | First |
| $Ta_2O_5$ | Binary | 2.727 | 100 | 99 | 100 | First |
| $TiO_2$ | Binary | 2.677 | 100 | 96.7 | 90 | First |
| $WO_3$ | Binary | 1.333 | 95 | 98.9 | 95 | First |
| $SnMo_4O_6$ | Ternary | 0.019 | 99.2 | 95 | 80 | First |
| $TiNb_3O_6$ | Ternary | 0.521 | 100 | 96.7 | 86.1 | First |
| $GeO_2$ | Binary | 3.250 | 97.5 | 98.3 | 100 | Second |
| $MoO_2$ | Binary | 0 | 97.5 | 97.5 | 55 | Second |
| $NbO_2$ | Binary | 0.165 | 100 | 90 | 2.5 | Second |
| SnO | Binary | 0.410 | 95 | 90 | 50 | Second |
| $Ti_3O_5$ | Binary | 0 | 90 | 93.3 | 60 | Second |
| $SnWO_4$ | Ternary | 0.915 | 95 | 95 | 50 | Second |
| $WO_2$ | Binary | 1.349 | 97.5 | 98.3 | 55 | Third |
| $Nb_2SnO_6$ | Ternary | 1.740 | 95 | 95 | 60 | Third |
| $Sn_2WO_5$ | Ternary | 2.410 | 95 | 95 | 50 | Third |
| $SnGeO_3$ | Ternary | 2.043 | 97.5 | 95 | 50 | Third |
| $Ta_2SnO_6$ | Ternary | 2.289 | 95 | 95 | 60 | Third |
| $TiSn_2O_4$ | Ternary | 1.081 | 97.5 | 95 | 75 | Third |
| $Ti_6O$ | Binary | 0 | 85 | 97.2 | 66.7 | Third |
| $Ti_2O$ | Binary | 0 | 75 | 91.7 | 60 | Exclude |
| $Ti_3O$ | Binary | 0 | 65 | 91.7 | 20 | Exclude |
| NbO | Binary | 0 | 60 | 82 | 55 | Exclude |
| $Ti_2O_3$ | Binary | 0 | 70 | 83.3 | 0 | Exclude |
| TiO | Binary | 0 | 35 | 75 | 10 | Exclude |

In one embodiment and in connection with Table 5, a bandgap ($E_g$) between 0 to 1 eV is considered good, 1 to 3 eV is considered semi-conducting and greater than 3 eV is considered insulating. The $H_3O^+$ reactivity is calculated by α in the following equation (5):

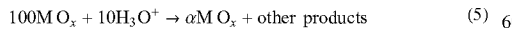

$$100M\,O_x + 10H_3O^+ \rightarrow \alpha M\,O_x + \text{other products} \quad (5)$$

In one embodiment and in connection with Table 5, α greater than or equal to 90 is considered protective, α between about 80 and 90 is considered mildly-protective and α less than 80 is considered reactive. The HF reactivity is calculated by β in the following equation (6):

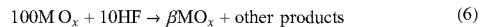

$$100M\,O_x + 10HF \rightarrow \beta MO_x + \text{other products} \quad (6)$$

In one embodiment and in connection with Table 5, β greater than or equal to 90 is considered protective, β between about 80 and 90 is considered mildly-protective and β less than 80 is considered reactive. The $SO_3^-$ reactivity is calculated by γ in the following equation (7):

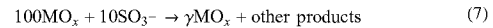

$$100MO_x + 10SO_3^- \rightarrow \gamma MO_x + \text{other products} \quad (7)$$

In one embodiment and in connection with Table 5, γ greater than or equal to 90 is considered protective, γ between about 80 and 90 is considered mildly-protective and γ less than 80 is considered reactive.

Table 6 shows a list of stable binary and ternary carbide materials for use as catalyst support materials in PEMFCs. Similar to Table 5, the computed bandgaps ($E_g$) is reported from materialsproject.org. The reactivities of the binary and ternary carbide materials with $H_3O^+$, HF, and $SO_3^-$ are examined in a similar fashion as Table 5. Based on reactivity and bandgap, the catalyst support materials of Table 6 are ranked as first-tier, second-tier, third-tier, or to be excluded. The first-tier materials may be used as catalyst supports. The first-tier candidate materials include: $Nb_6C_5$, $Mo_2C$, $Ta_2C$, $Ti_8C_5$, and WC. The second-tier and third-tier materials in Table 6 may be less protective in the PEMFC environment, compared to the first-tier materials. Some materials in Table 6 may be more insulating than the others. These insulating materials may be further optimized by mixing with more conducting materials such as carbon in the percentages identified above. Table 6 is shown below.

TABLE 6

| Compound | Oxide Class | Eg [eV] | Reactivities | | | Tier |
| | | | $H_3O^+$ | HF | $SO_3^-$ | |
|---|---|---|---|---|---|---|
| $Nb_6C_5$ | Binary | 0 | 99.2 | 99.3 | 96.2 | First |
| $MO_2C$ | Binary | 0 | 94.4 | 94.4 | 80 | First |
| $Ta_2C$ | Binary | 0 | 96 | 98 | 83 | First |
| $Ti_8C_5$ | Binary | 0 | 91.7 | 97.2 | 86.7 | First |
| WC | Binary | 0 | 94.4 | 94.4 | 85 | First |
| TaC | Binary | 0 | 96 | 98 | 78 | Second |
| $Nb_2SnC$ | Ternary | 0 | 93.8 | 95 | 75 | Second |
| $Ti_2GeC$ | Ternary | 0 | 92.5 | 97.1 | 50 | Second |
| $Ti_3SnC_2$ | Ternary | 0 | 95.5 | 98.3 | 70 | Second |
| $Ti_3GeC_2$ | Ternary | 0 | 88.6 | 95.6 | 86.7 | Second |
| MoC | Binary | 0 | 71.5 | 92.2 | 80 | Third |
| $Nb_2C$ | Binary | 0 | 68.8 | 88.8 | 53.1 | Exclude |
| $Ti_2SnC$ | Ternary | 0 | 56.7 | 83.3 | 50 | Exclude |
| $Ti_2C$ | Binary | 0 | 0 | 79.7 | 0 | Exclude |

In one embodiment and in connection with Table 6, a bandgap ($E_g$) between 0 to 1 eV is considered good, 1 to 3 eV is considered semi-conducting and greater than 3 eV is considered insulating. The $H_3O^+$ reactivity is calculated by α in the following equation (8):

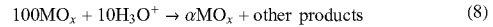

$$100MO_x + 10H_3O^+ \rightarrow \alpha MO_x + \text{other products} \quad (8)$$

In one embodiment and in connection with Table 6, α greater than or equal to 90 is considered protective, α between about 80 and 90 is considered mildly-protective and α less than 80 is considered reactive. The HF reactivity is calculated by β in the following equation (9):

$$100MO_x + 10HF \rightarrow \beta MO_x + \text{other products} \qquad (9)$$

In one embodiment and in connection with Table 6, β greater than or equal to 90 is considered protective, β between about 80 and 90 is considered mildly-protective and β less than 80 is considered reactive. The $SO_3^-$ reactivity is calculated by γ in the following equation (10):

$$100MO_x + 10SO_3- \rightarrow \gamma MO_x + \text{other products} \qquad (10)$$

In one embodiment and in connection with Table 6, γ greater than or equal to 90 is considered protective, γ between about 80 and 90 is considered mildly-protective and γ less than 80 is considered reactive.

Table 7 shows a list of stable binary and ternary intermetallic compounds for use as catalyst support materials in PEMFCs. Like Table 7, the computed bandgaps ($E_g$) is reported from materialsproject.org. The compounds in the first column may be further oxidized by heat treatment, for example. The possible oxide products (at their fully-oxidized states) are shown in Table 7. In other embodiments, partially oxidized materials may be utilized as catalyst supports. The partially oxidized metal oxide may be represented by $MO_{x-y}$, where $MO_x$ corresponds to a fully oxidized metal oxide state, and y is less than or to x in the partially oxidized metal oxide. In Table 7, x ranges from 2 to 3. For example, $Nb_2O_5$ can be otherwise represented as $NbO_{2.5}$. Accordingly, in Table 7, y is less than or equal to 3 and y is less than or equal to x. M may also be represented as A and B in the case of a ternary metal oxide. The partially oxidized ternary metal oxide may be represented by $ABO_{x-y}$ (where the subscripts of A and B add up to 1). For instance, $SnMo_4O_6$ represents a fully oxidized ternary metal oxide state. This may be normalized to $Sn_{0.2}Mo_{0.8}O_{1.2}$. O can be between 0 and 1.2 to represent a partially oxidized ternary metal oxide. Based on the oxide products and using the analysis in Table 5, the binary and ternary intermetallic compounds are placed in first and second tiers. As can be seen in Table 7, intermetallic compounds containing Ge are classified in the second tier as $GeO_2$ is classified in the second tier in Table 7. Upon oxidation using heat treatment of the binary and ternary intermetallic compounds, solid-solution or nanocomposite materials may be formed depending on mixing energy and heat treatment temperature, and potentially other operating conditions. These materials may be further mixed with conducting materials such as carbon and/or conducting polymers to enhance their electronic conductivity. Table 7 is shown below.

TABLE 7

| Compounds | Intermetallic Class | $E_g$ [eV] | Fully-Oxidized Products | Tier |
|---|---|---|---|---|
| MoW | Binary | 0 | $MoO_3$ and $WO_3$ | First |
| $NbSn_2$ | Binary | 0 | $Nb_2O_5$ and $SnO_2$ | First |
| $Nb_3Sn$ | Binary | 0 | $Nb_2O_5$ and $SnO_2$ | First |
| $Sn_2Mo$ | Binary | 0 | $SnO_2$ and $MoO_3$ | First |
| $TaSn_2$ | Binary | 0 | $Ta_2O_5$ and $SnO_2$ | First |
| $Ta_3Sn$ | Binary | 0 | $Ta_2O_5$ and $SnO_2$ | First |
| $TaW_3$ | Binary | 0 | $Ta_2O_5$ and $WO_3$ | First |

TABLE 7-continued

| Compounds | Intermetallic Class | $E_g$ [eV] | Fully-Oxidized Products | Tier |
|---|---|---|---|---|
| TiMo | Binary | 0 | $TiO_2$ and $MoO_3$ | First |
| $TiMo_3$ | Binary | 0 | $TiO_2$ and $MoO_3$ | First |
| $Ti_2Mo$ | Binary | 0 | $TiO_2$ and $MoO_3$ | First |
| $Ti_3Mo$ | Binary | 0 | $TiO_2$ and $MoO_3$ | First |
| TiNb | Binary | 0 | $TiO_2$ and $Nb_2O_5$ | First |
| $Ti_2Sn$ | Binary | 0 | $TiO_2$ and $SnO_2$ | First |
| $Ti_2Sn_3$ | Binary | 0 | $TiO_2$ and $SnO_2$ | First |
| $Ti_3Sn$ | Binary | 0 | $TiO_2$ and $SnO_2$ | First |
| $Ti_6Sn_5$ | Binary | 0 | $TiO_2$ and $SnO_2$ | First |
| $NbMo_2W$ | Ternary | 0 | $Nb_2O_5$, $MoO_3$ and $WO_3$ | First |
| $TaMo_2W$ | Ternary | 0.067 | $Ta_2O_5$, $MoO_3$ and $WO_3$ | First |
| $TiMo_2W$ | Ternary | 0 | $TiO_2$, $MoO_3$ and $WO_3$ | First |
| $Ti_2NbSn$ | Ternary | 0 | $TiO_2$, $Nb_2O_5$ and $SnO_2$ | First |
| $GeMo_3$ | Binary | 0 | $GeO_2$ and $MoO_3$ | Second |
| $Ge_2Mo$ | Binary | 0 | $GeO_2$ and $MoO_3$ | Second |
| $NbGe_2$ | Binary | 0 | $Nb_2O_5$ and $GeO_2$ | Second |
| $Nb_5Ge_3$ | Binary | 0 | $Nb_2O_5$ and $GeO_2$ | Second |
| SnGe | Binary | 0.220 | $SnO_2$ and $GeO_2$ | Second |
| $TaGe_2$ | Binary | 0 | $Ta_2O_5$ and $GeO_2$ | Second |
| $Ta_3Ge$ | Binary | 0.003 | $Ta_2O_5$ and $GeO_2$ | Second |
| $Ta_5Ge_3$ | Binary | 0 | $Ta_2O_5$ and $GeO_2$ | Second |
| $TiGe_2$ | Binary | 0 | $Ta_2O_5$ and $GeO_2$ | Second |
| $Ti_5Ge_3$ | Binary | 0 | $Ta_2O_5$ and $GeO_2$ | Second |
| $Ti_6Ge_5$ | Binary | 0 | $Ta_2O_5$ and $GeO_2$ | Second |

In one or more embodiments, the one or more of the compounds identified above may be used as catalyst support materials in a PEMFC to support a catalyst material, such as Pt. In other embodiments, the catalyst support material may include or partially include $d^0$ metals such as $Zr^{4+}$, $Hf^{4+}$, $V^{5+}$, and/or $Cr^{6+}$, and/or $d^{10}$ metals such as $Zn^{2+}$, $Ga^{3+}$, and/or $Pb^{4+}$, as well as $Al^{3+}$ (no d electrons), that may be more difficult to be oxidized.

The catalyst support materials may decompose into one or more decomposed species configured to aid in electron transport in a PEMFC and/or protect against an acidic environment in PEMFCs. One or more of the decomposed species may form a stable conducting, and protective solid-electrolyte interface (SEI). Depending on the energetics of a reaction (e.g., between $H_3O^+$, HF and/or $SO_3^-$) with a catalyst support material, the decomposed species may be metal oxides, sulfides, fluorides and/or carbides. For example, in the chemical reaction $100SnO_2 + 10HF \rightarrow 98.3SnO_2 + 1.67SnF_4 + 3.33H_3OF$ set forth above, $SnF_4$ and $H_3OF$ are decomposed species on the reaction side. In one or more embodiments, decomposed species may be conductive and/or protective.

The catalyst support material may be selected based on its chemical stability in an acidic environment and its relatively high stability against corrosion and oxidation environments during fuel cell operation conditions. Electronic conductivity of the catalyst support material may be tuned to improve performance and/or reliability of the catalyst support material.

The catalyst support material may contribute to either activity or stability. For example, Pt on $TiO_2$ may bind $H_2O$ and $H_3O^+$ weakly, compared to pure Pt; while Pt on $SnO_2$ may bind these adsorbates more strongly. The composite oxide and/or carbides may contribute to either/both activity and/or stability of catalyst layer, when coupled with catalyst materials such as Pt.

Figure 9A:
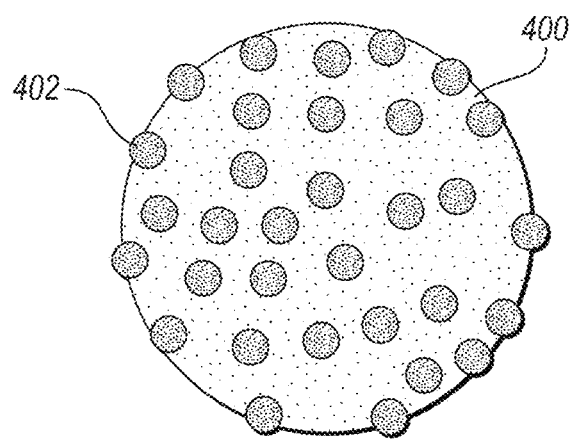
FIG. 9A is a schematic view depicting a spherical catalyst support upon which catalyst particles are supported according to one embodiment.
Figure 9B:
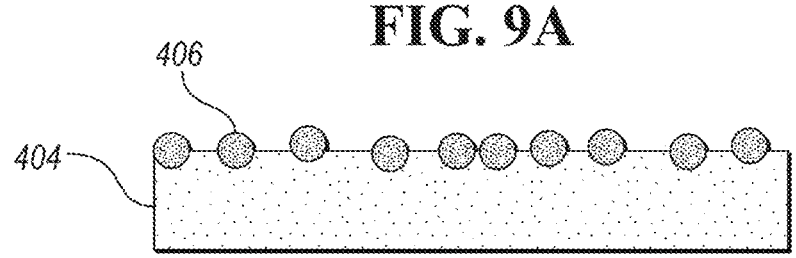
FIG. 9B shows a schematic view depicting a planar catalyst support upon which catalyst particles are supported according to one embodiment.
Figure 9C:
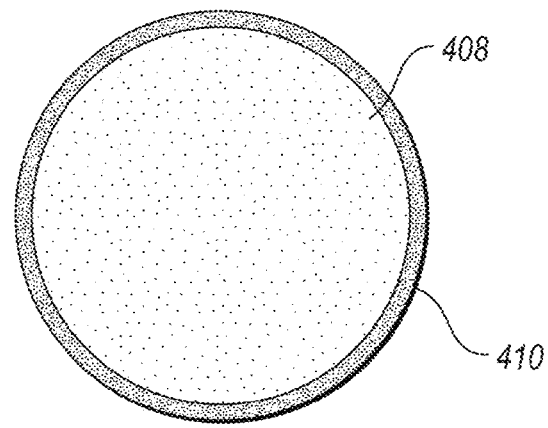
FIG. 9C shows a schematic view depicting a core catalyst support upon which a shell of continuous catalyst film is supported according to one embodiment.
Figure 9D:
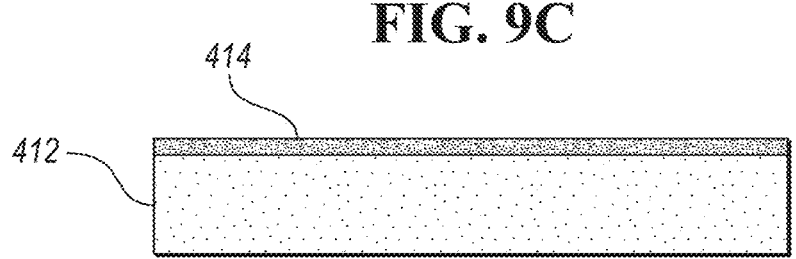
FIG. 9D shows a schematic view depicting a planar catalyst support upon which a continuous catalyst film is supported according to one embodiment.

FIG. 9A is a schematic view depicting a spherical catalyst support 400 upon which catalyst particles 402 are supported. FIG. 9B shows a schematic view depicting a planar catalyst support 404 upon which catalyst particles 406 are supported. FIG. 9C shows a schematic view depicting a core catalyst support 408 upon which a shell of continuous catalyst film 410 is supported. FIG. 9D shows a schematic view depicting a planar catalyst support 412 upon which a continuous catalyst film 414 is supported. As shown above, the catalyst support materials may be oxides, carbides, composite materials and combinations thereof. The catalyst support materials may be prepared using (1) a solution-based process, (2) a solid-state process, (3) a heat-treatment process, and/or (4) an electrochemical process.

In one example of a solution-based process, a metal-containing precursor chemical (such as $M(NO_3)_x$, $MCl_x$, $NH_4HPO_4$) is dissolved in water or an organic solvent. The solution is heat treated at an elevated temperature for an aging time. The elevated temperature may be any of the following values or in a range of any two of the following values: 100, 300, 500, 700, 900, 1,100, 1,300, 1,500, 1,700 and 2,000° C. The aging time may be any of the following values or in a range of any two of the following values: 1, 2, 3, 4, 8, 12, 16, 24, 36, 48, 60 and 72 hours. The pH of the solution may be controlled by the presence of oxidizing or reducing agents. Catalyst materials (e.g., Pt) may be deposited afterwards. Non-limiting examples of deposition techniques include solid-state process, solution-based process and/or other deposition techniques.

Variously sized oxide and/or carbide materials can be synthesized via a solid-state method. The size range may any of the following values or in a range of any two of the following values: 5, 10, 20, 40, 60, 80, 100, 200, 300, 400, and 500 nm. In another embodiment, the size range may any of the following values or in a range of any two of the following values: 0.75, 1, 2, 5, 10, 15, 20, 40, 60, 80, 100, 200, 300, 400, and 500 µm. One suitable solid-state method is a ball-milling process. The solid-state method may be followed by an optional secondary heat treatment. In embodiments using binary and ternary intermetallic compounds, the amount of oxides and/or their compositions in a surface film and a bulk region may be controlled depending on the secondary heat-treatment conditions (such as temperature and/or presence of oxidizing or reducing agents)

In one embodiment, the catalyst support material may be ternary, quarterly or a higher chemical space. In one embodiment, the chemical formula $ABX_y$, represents the catalyst support material, where A and B are metals listed in Tables 5 through 7 (i.e., Ti, Nb, Ta, Mo, W, Ge, Sn), and X is C, O, F, N and/or P and y may vary from 0 to 8. These catalyst support materials may be present in solid-solution form, nanocomposite, or form a distinct domain, depending on mixing energies.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A catalyst support material for a proton exchange membrane fuel cell (PEMFC), the catalyst support material comprising:
a metal material of an at least partially oxidized form of $TiNb_3O_6$ reactive with $H_3O^+$, HF and/or $SO_3^-$ to form reaction products in which the metal material of the at least partially oxidized form of $TiNb_3O_6$ accounts for a stable molar percentage of the reaction products.

2. The catalyst support material of claim 1, wherein the stable molar percentage is greater than or equal to 80 percent.

3. The catalyst support material of claim 1, wherein the metal material includes a mixture of an at least partially oxidized form of $SnMo_4O_6$ and the at least partially oxidized form of $TiNb_3O_6$.

4. The catalyst support material of claim 1, wherein the metal material is a spherical metal material.

5. The catalyst support material of claim 1, wherein the metal material is a planar metal material.

6. The catalyst support material of claim 1, wherein the metal material is doped with a doping material at an atomic percentage, and the doping material is selected from the group consisting of nitrogen, carbon, fluorine, and a combination thereof.

7. The catalyst support material of claim 6, wherein the atomic percentage is in the range of 1 to 25 atomic percent.

8. The catalyst support material of claim 1, wherein the metal material is mixed with a conducting material.

9. The catalyst support material of claim 8, wherein the conducting material is carbon.

10. The catalyst support material of claim 8, wherein the conducting material is included in the range of 5 to 50 mol percent with respect to the mixture of the metal material and the conducting material.

11. A proton exchange membrane fuel cell (PEMFC) comprising:
a catalyst support material formed of a metal material of an at least partially oxidized form of $TiNb_3O_6$ reactive with $H_3O^+$, HF and/or $SO_3^-$ to form reaction products in which the metal material of an at least partially oxidized form of $TiNb_3O_6$ accounts for a stable molar percentage of the reaction products; and
a catalyst supported on the catalyst support material.

12. The PEMFC of claim 11, wherein the catalyst support material includes one or more decomposed species to aid in electron transport through the PEMFC.

13. The PEMFC of claim 12, wherein the one or more decomposed species forms a solid-electrolyte interface (SEI).

14. The PEMFC of claim 11, wherein the stable molar percentage is greater than or equal to 80 percent.

15. The PEMFC of claim 11, wherein the catalyst support material is a core catalyst support material upon which a shell of a continuous film of the catalyst is supported.

16. The PEMFC of claim 11, wherein the catalyst support material is a planar catalyst support material upon which a continuous film of the catalyst is supported.

17. The PEMFC of claim 11, wherein the metal material is doped with a doping material at an atomic percent, and the doping material is selected from the group consisting of nitrogen, carbon, fluorine, and a combination thereof.

18. The PEMFC of claim 11, wherein the metal material is mixed with a conducting material.

19. A proton exchange membrane fuel cell (PEMFC) comprising:
- a catalyst support material formed of a metal material of an at least partially oxidized form of $TiNb_3O_6$ reactive with $H_3O^+$, HF and/or $SO_3^-$ to form reaction products in which the metal material of an at least partially oxidized form of $TiNb_3O_6$ accounts for a stable molar percentage of the reaction products; and
- a catalyst film supported on the catalyst support material.

20. The PEMFC of claim 19, wherein the catalyst support material is a planar catalyst support material.

* * * * *